Patented Nov. 20, 1951

2,575,375

UNITED STATES PATENT OFFICE 2,575,375

DIALDEHYDO COMPOUNDS

Donald T. Warner and Owen A. Moe, Minneapolis, Minn., assignors to General Mills, Inc., a corporation of Delaware No Drawing. Application October 21, 1949, Serial No. 122,849

9 Claims. (Cl. 260—483)

The present invention relates to dialdehydo compounds having the following formula and to a process of producing them:

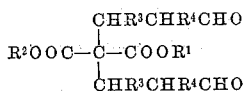

where $R^1$ and $R^2$ are low alkyl groups containing 1 to 4 carbon atoms, and $R^3$ and $R^4$ are selected from the group consisting of hydrogen and methyl. These dialdehydo compounds are useful for the preparation of the corresponding alcohols and acids. The dialdehydo compounds themselves may be condensed with two moles of cyanoacetic ester to produce compounds useful in the preparation of tricarboxylic acids, or the cyano esters thus obtained may themselves be used as plasticizers. Furthermore the high functionality of the compounds of the present invention renders them useful in general for further organic syntheses.

It is therefore an object of the present invention to provide novel compounds having the above formula and to provide a process of producing them.

The dialdehydo compounds of the present invention may be prepared by the 1,4 addition of alpha, beta-unsaturated aldehydes, such as acrolein, crotonaldehyde, and methacrolein, to unsubstituted malonic esters. These reactions are carried out in the presence of an alkaline catalyst, such as an alkali metal alkoxide, or in the presence of certain basic materials, such as tertiary amines, for example, tributyl amine. With the alkali metal alkoxide catalyst the amount of catalyst is preferably held within the range of approximately 0.001 to 0.10 mole per mole of reagent used. Variations of catalyst outside this range may be employed, but, in general when the amount of catalyst exceeds the one-tenth mole ratio there is a tendency for side reactions which cut down the yield of the desired aldehyde and accordingly such higher molar ratios of catalyst are not preferred. With other catalysts such as tributyl amine, the amount of catalyst is not as critical and it is possible to use much larger quantities of catalyst up to equi-molar proportions.

The reaction is carried out in the presence of a suitable solvent diluent which does not enter into the reaction. Almost any solvent diluent which meets this test may be employed. Suitable solvents include alcohols such as ethanol, ethers such as diethyl ether, and hydrocarbon solvents such as benzene. The amount of solvent employed may be varied considerably. Usually it is desired to employ a quantity of solvent at least equal to the amount of the ester employed. In general, the larger the quantity of solvent employed, the easier it is to control the reaction in the desired direction. It is apparent that the quantity of solvent employed is limited by the problem of recovering the solvent.

The temperature employed during the addition reaction is subject to considerable change. Usually a temperature within the range of 0–50° C. is desirable. At temperatures above 50° C. there is some possibility of side reactions.

In carrying out the reaction it is preferred to prepare a solution of the malonic ester in the solvent and to add the catalyst to this solution. The resultant solution is then cooled to a suitable temperature for reaction and the unsaturated aldehyde is added slowly to the solution over an extended period of time. In this way it is possible to control the temperature of the reaction mixture very readily to within the desired range, and thus to control the reaction in the desired direction. After the reaction has been completed, the catalyst may be neutralized and the product worked up in a conventional manner.

In carrying out the reaction it is apparent that two moles of the unsaturated aldehyde are necessary for each mole of the malonic ester. It is possible to carry out the reaction step-wise, that is, by the addition of one mole of the alpha, beta-unsaturated aldehyde which results in the introduction of a single aldehyde group. This compound may then be reacted with a further mole of the alpha,beta-unsaturated aldehyde to introduce the second aldehyde group. It is also apparent that excesses of the alpha,beta-unsaturated aldehyde may be employed.

The reaction is applicable to acrolein, methacrolein, and crotonaldehyde. Considerable variation is also possible in the malonic ester. Thus while the examples are with reference to ethyl malonate, inasmuch as this compound is readily available, it is apparent that compounds having similar properties may be prepared from malonic esters in which methyl, propyl or butyl alcohol groups are present in the ester.

*Example 1*

Absolute ethanol (50 cc.) was reacted with 15 mg. of metallic sodium to produce a solution of sodium ethoxide. 16 g. of diethyl malonate were added and the solution was cooled to 6° C. Acrolein (12 g.) dissolved in 10 cc. absolute ethanol was added dropwise with continuous cooling. The reaction temperature increased rapidly but was maintained within the range of 10–17° C. by controlling the rate of addition. Upon completion of the reaction the catalyst was neutralized with glacial acetic acid. The reaction mixture was then concentrated in vacuo to a viscous water-white syrup. This syrup was the crude gamma, gamma-dicarbethoxy-pimelic dialdehyde.

*Example 2*

Five hundred cc. of absolute ethanol were mixed with 0.1 g. of metallic sodium. When all of the sodium had reacted, 128.1 g. of ethyl malonate were added and the resulting solution was cooled to 0° C. To this cold solution 43.9 g. of acrolein (containing 1% hydroquinone) were added dropwise over a period of 2½ hours. The acrolein was added at such a rate that the temperature could be maintained between 0–5° C. When the addition of the alpha,beta-unsaturated aldehyde was complete, the reaction mixture was stirred for an additional 5 hours at 0–5° C. The catalyst was then neutralized by the addition of 0.5 g. of glacial acetic acid. After the neutralization of the catalyst the reaction mixture was concentrated in vacuo to a rather viscous residue.

A small portion of this viscous residue was treated with 2,4-dinitrophenylhydrazine to yield the crude 2,4-dinitrophenylhydrazone which separated as an oily material. After rigorous purification by repeated crystallizations from absolute alcohol the pure 2,4-dinitrophenylhydrazone of gamma,gamma-dicarbethoxybutyraldehyde melted at 74–75° C.

Gamma,gamma - dicarbethoxybutyraldehyde was purified by distillation in the following manner. Six hundred cc. of benzene were added to the above viscous residue and the benzene solution washed with four 100 cc. portions of water. After the water washings the benzene solution was dried over anhydrous sodium sulfate. The sodium sulfate was removed by filtration and the clear benzene filtrate was concentrated in vacuo and the residual viscous oil distilled at low pressure. The first fraction containing a small amount of diethyl malonate was discarded. The main fraction was collected over the range 98–105° C. at 0.2–0.3 mm. The residual oil remaining in the distillation flask possessed a light yellow color and began to decompose slightly at 105° C. at which time the distillation was interrupted.

The main fraction of the distillate was redistilled and the desired product was collected over the range 77–80° C. at 0.08 mm. An analytical sample prepared by a further distillation showed a boiling point of 75–76° C. at 0.07 mm. and $n_D^{25}$ 1.4345. The compound was further characterized by the preparation of the 2,4-dinitrophenylhydrazone which melted at 75–76° C.

142.4 g. of gamma,gamma-dicarbethoxybutyraldehyde prepared as above described, were dissolved in 250 cc. of absolute ethanol. The temperature of the solution increased from 27° C. to 36° C., probably due to hemiacetal formation. The alcoholic solution was cooled to −3° C. and a solution of sodium ethoxide (prepared from 0.15 g. of sodium in 10 cc. of absolute ethanol) was added. The temperature rose slightly to +3° C. The mixture was again cooled to −1° C. and acrolein (40 g.) was added dropwise with continual cooling so that the reaction temperature was maintained at 5° C. After 16 hours the catalyst was neutralized with 0.5 cc. of glacial acetic acid. The water-white solution was concentrated in vacuo to remove the ethanol. The residual syrup was dissolved in 325 cc. of benzene and washed 4 times with 150 cc. portions of distilled water. The benzene layer was dried over anhydrous sodium sulfate. The benzene was removed in vacuo and the residual syrup was distilled. The main fraction of the gamma,gamma-dicarbethoxypimelic dialdehyde was collected at 145–151° C./0.80–0.97 mm. The dialdehyde was converted to the 2,4-dinitrophenylhydrazone in the conventional manner. After recrystallization from ethyl acetate, the 2,4-dinitrophenylhydrazone of gamma,gamma-dicarbethoxypimelic dialdehyde melted at 182.5–183.5° C.

Analysis—
 Calculated for $C_{25}H_{28}O_{12}N_8$:
  C, 47.46%; H, 4.46%; N, 17.72%
 Found:
  C, 47.22%; H, 4.41%; N, 17.90%

Methacrolein may be substituted for acrolein in any of the above examples and will result in the production of gamma,gamma-dicarbethoxy-alpha,epsilon-dimethylpimelic dialdehyde. Similarly crotonaldehyde may be substituted for acrolein in the examples to produce gamma,-gamma - dicarbethoxy - beta,delta - dimethylpimelic dialdehyde.

With the technique described in Example 2, it will be apparent that it is possible to introduce one mole of one alpha,beta-unsaturated aldehyde and to introduce a second mole of a different alpha,beta-unsaturated aldehyde. Thus it is possible for the groups $R^3$ and $R^4$ to be mixed in a single compound. It is also apparent that it is possible to use a mixture of alpha,beta-unsaturated aldehydes in the first instance, and thus get a mixture of compounds.

While various modifications of the invention have been described, it will be understood that other variations are possible without departing from the spirit thereof.

We claim as our invention:

1. Dialdehydo compounds having the following formula

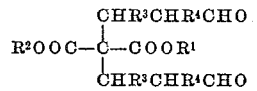

where $R^1$ and $R^2$ are low alkyl groups containing 1 to 4 carbon atoms, and $R^3$ and $R^4$ are selected from the group consisting of hydrogen and methyl.

2. Gamma,gamma - dicarbethoxypimelic dialdehyde.

3. Gamma,gamma - dicarbethoxy - alpha, epsilon-dimethyl pimelic dialdehyde.

4. Gamma,gamma - dicarbethoxy - beta, delta-dimethyl pimelic dialdehyde.

5. Process of producing dialdehydo compounds having the following formula

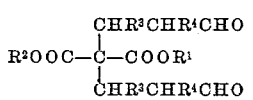

where $R^1$ and $R^2$ are low alkyl groups containing 1 to 4 carbon atoms, and $R^3$ and $R^4$ are selected from the group consisting of hydrogen and methyl, which comprises reacting two moles of an alpha,beta-unsaturated aldehyde having the formula

and one mole of a malonic ester in the presence of an alkaline catalyst and in the presence of an inert solvent.

6. Process of producing gamma,gamma-dicarbethoxy-pimelic dialdehyde, which comprises reacting two moles of acrolein with one mole of ethyl malonate in the presence of an alkaline catalyst and in the presence of an inert solvent.

7. Process of producing gamma,gamma-dicarbethoxy-alpha, epsilon-dimethylpimelic dialdehyde, which comprises reacting two moles of methacrolein with one mole of ethyl malonate in the presence of an alkaline catalyst and in the presence of an inert solvent.

8. Process of producing gamma,gamma-dicarbethoxy-beta,delta-dimethylpimelic dialdehyde, which comprises reacting two moles of crotonaldehyde with one mole of ethyl malonate in the presence of an alkaline catalyst and in the presence of an inert solvent.

9. Process of producing dialdehydo compounds having the following formula

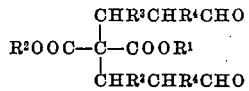

where $R^1$ and $R^2$ are low alkyl groups containing 1 to 4 carbon atoms, and $R^3$ and $R^4$ are selected from the group consisting of hydrogen and methyl, which comprises preparing a solution of a malonic ester and an alkaline catalyst in an inert solvent, adding an alpha,beta-unsaturated aldehyde having the formula $$CHR^3{=}CHR^4CHO$$

the amount of the unsaturated aldehyde being at least two moles per mole of malonic ester.

DONALD T. WARNER.
OWEN A. MOE.

REFERENCES CITED

The following references are of record in the file of this patent:

Doebner, Berichte 35, 1143–1147 (1902).
Farmer et al., Jour. Chem. Soc. London 1931, 2561–2568.